Dec. 7, 1943. R. L. WILSON 2,335,984
CONTROL APPARATUS
Filed Nov. 25, 1940
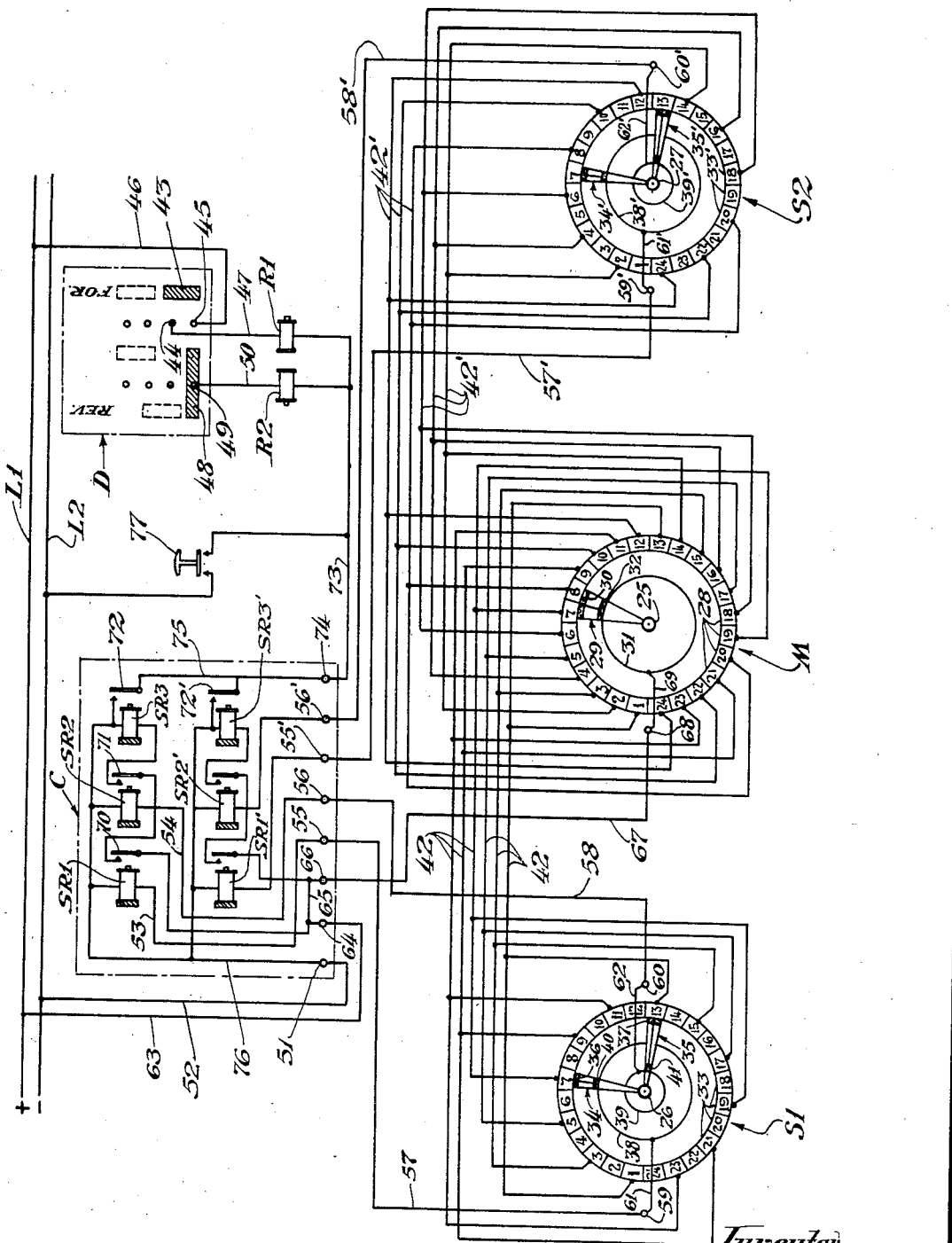
Inventor
Rosser L. Wilson
By Wallace and Cannon
Attorneys.

UNITED STATES PATENT OFFICE 2,335,984

CONTROL APPARATUS

Rosser L. Wilson, Mahwah, N. J., assignor to American Brake Shoe Company, a corporation of Delaware Application November 25, 1940, Serial No. 366,987

6 Claims. (Cl. 175—355)

This invention relates to apparatus for use in controlling the relative speeds of moving parts of machinery, and it relates particularly to such apparatus for use in maintaining a substantially synchronous relation in the rotative speeds of three or more rotating parts such as the axles or wheels of railway equipment.

In the normal operation of railway equipment it is believed that there is no slippage at the points of contact of the wheels of the equipment with the rails and that the wheels roll along the rails. During a braking operation on such equipment, or during an acceleration of such equipment by operation of a plurality of independently rotatable drive wheels or the like, the forces effective between the wheels and the rails may in many instances become less than the force or forces which are acting upon the wheel or wheels to produce acceleration or deceleration of such wheel or wheels. In such instances there is a tendency toward sliding in the event that the wheels are in the course of a deceleration, or there is a tendency toward rapid slip of the wheels upon the rail in those instances where the wheel is a driving wheel such as that of a locomotive.

Where such slipping or rapid rotation of a driving wheel takes place as, for example, in the starting of a train, such rapid sliding of one or more of the wheels results in a substantial loss of driving power, and it is desirable to prevent such slipping or rapid rotation of the drive wheels. In many instances locomotives are equipped with three or more driving wheels which are independently driven so as to be independently rotatable, and an important object of the present invention is to enable slipping of any one or more of the drive wheels of such a locomotive to be detected so that appropriate corrective measures may be taken to reestablish the normal rolling relationship of the wheel or wheels with respect to the rail.

A further object is to enable lack of substantial synchronism in three or more relatively movable elements to be detected and to enable an appropriate control operation to be performed when such lack of synchronism is detected.

Further objects related to the foregoing are to enable such lack of synchronism in three or more relatively movable elements to be detected through the use of a commutator mechanism; to enable a single master commutator to cooperate with two or more secondary commutators to detect lack of substantial synchronism between three or more such relatively movable elements; and to enable a substantial portion of the commutator structures of all of such elements to be of similar size and construction whereby to simplify the manufacture and installation of the mechanism involved.

Other and further objects of the present invention will be apparent from the following description and claims and are illustrated in the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

The accompanying drawing is a diagrammatic illustration of a selected embodiment of my invention.

As shown in the drawing, a master commutator switch, generally designated M, is associated with one of the independently rotatable elements with which my invention is used and which may be a shaft as 25 that may be, for example, an axle of a railway vehicle. Further, in the present instance, two secondary commutator switches S1 and S2 are respectively associated with independently rotatable elements such as shafts 26 and 27 which may be other axles of the aforesaid railway vehicle and whose speeds of rotation are to be compared with the rotative speed of the master shaft or axle 25.

A control unit generally designated C, particularly described hereinafter, is arranged to be governed by the commutator switches M, S1 and S2 in a manner presently to be explained for the purpose of detecting a variation in the operative condition of either of the means to which the commutator switches S1 or S2 are responsive with respect to the means to which the commutator switch M is responsive, the unit C being effective to initiate a control operation whenever such variation exceeds a predetermined amount. An example of an instance where the apparatus may be so utilized is in the case of railway equipment or the like wherein it is desired to detect an abnormal discrepancy in the rotative speeds of two or more wheels which is indicative of a tendency toward a wheel sliding condition during acceleration or deceleration of the railway equipment or the like, and to bring about the operation of means, such as sanding apparatus, for correcting the condition.

Considering first the master switch M, it will be noted that this switch includes a series of twenty-four circularly arranged commutator bars 28 which have been consecutively numbered in the drawing from 1 to 24, inclusive, although it will be understood that a greater or less number of such bars may be employed if desired. The commutator of the switch M is stationarily mounted concentrically with respect to the shaft 25 for cooperation with a rotatable brush generally designated 29 which is driven by the shaft 25, preferably by being secured directly thereto as indicated in the drawing, the brush 29 including a conductive portion 30 that is adapted to make wiping contact with the commutator bars 28. A stationary conducting ring 31 is mounted concentrically with respect to the shaft 25, and a conductive portion 32 of the brush 29 is positioned to have sliding contact with a ring 31. The portions 30 and 32 of the brush 29 are electrically connected so that as the brush 29 is rotated by the shaft 25, the commutator bars 28 are successively connected electrically to the ring 31, and preferably the conductive portion 30 is of such width that it is in engagement with at least two of the bars 28 at each instant, although this brush width may be varied in dependence upon the degree of sensitivity which is required of the apparatus, as will be explained.

The secondary switch S1 has a stationary commutator which, in this instance, is of the same diameter as the commutator of the master switch M, but it will be understood that the relative diameters of the commutators is immaterial and that the controlling factor is the angular relationship and extent of the commutator bars. The diameters of the commutators may, therefore, be varied as desired to meet manufacturing or installation requirements. This stationary commutator comprises a series of twenty-four commutator bars 33 which are arranged circularly and concentrically with respect to the shaft 26, these bars being numbered 1 to 24, inclusive, in a manner corresponding to that in which the commutator bars 28 of the switch M are numbered in the drawing. It will be understood that the number of bars in a commutator of such a secondary switch, in any event, includes a number of commutator bars that is equal to, or a complete or fractional multiple, of the number of bars in the commutator of the master switch. The switch S1 has two rotatable brushes 34 and 35 which are preferably spaced apart in the amount of ninety degrees, for a purpose which will appear hereinafter, and which are secured to the shaft 26 to be driven rotatably thereby. These brushes have conductive portions 36 and 37, respectively, which make wiping contact with the commutator bars 33 as the brushes are rotated, and each of these conductive portions is preferably of a width not greater than the width of one of the bars 33, although this brush width may be varied within limits as in the case of the master brush 29.

The switch S1 also includes two conducting rings 38 and 39 which are stationarily mounted concentrically with respect to the shaft 26. The brush 34 has a conductive portion 40 which has sliding contact with the ring 38, and is electrically connected to the portion 36 so that the brush 34 successively establishes electrical connections between the various commutator bars 33 and the ring 38 as this brush is rotated. Similarly, the brush 35 has a conductive portion 41 which is slidably engaged with the ring 39 and is electrically connected to the portion 37 so that as the brush 35 rotates, it successively connects the various commutator bars 33 electrically with the ring 39.

The secondary switch S2 is allocated to the rotatable element or shaft 27 and is of a construction which is identical with that of the switch S1, having a similar arrangement of commutator bars, brushes and rings, and therefore similar reference characters, differing only in the prime suffix, have been applied to those parts of the switch S2 which correspond to parts of the switch S1. Thus, the shaft 27 drives the brushes 34' and 35' rotatively to enable the brush 34' to successively establish electrical contacts between the commutator bars 33' and the ring 38', and the brush 35' to successively establish electrical contacts between the commutator bars 33' and the ring 39'.

The diametrically opposed commutator bars 28 of the master switch M are electrically connected together pair by pair, and hence, for example as shown in the drawing, when the brush 29 is engaging, say, the commutator bars numbered 7 and 8, it is likewise in electrical contact with the diametrically opposite commutator bars numbered 19 and 20, respectively. Although the diametrically opposed bars 28 have been represented as being interconnected pair by pair by means of external conductors, it will be understood that in practice, if such a manner of connection is not desirable, the commutator bars may be, for instance, internally connected by wires cast in the molded body of the commutator, or any other suitable arrangement may be employed for this purpose in different constructions of the switch.

The odd-numbered commutator bars of the switch S1 are respectively connected to their diametrically opposed bars in a manner similar to that employed in the case of the switch M. However, in the case of the switch S1 the even-numbered bars are not utilized and are, in effect, dead contacts insofar as the operation of the apparatus is concerned. In the case of the switch S2, however, the even-numbered commutator bars 33' are respectively connected to their diametrically opposed commutator bars 33', and the odd-numbered commutator bars 33' are dead. Although this arrangement results in an excess number of commutator bars being employed in the cases of the switches S1 and S2, this is offset by the fact that the commutators of the various switches M, S1 and S2 are of uniform construction and hence can be readily manufactured and interchanged. In certain instances, of course, the odd-numbered commutator bars 33' may be omitted entirely, in which instances the commutators may be made of different diameters or of substantially different construction than that herein shown, but if resort is had to some arrangement other than that herein shown, the advantage of uniformity is lost.

For a purpose to be explained hereinafter, it is desirable that the odd-numbered commutator bars of the switch M shall be electrically connected with the corresponding odd-numbered bars of the switch S1, while the even-numbered bars of the switch M are connected with corresponding even-numbered commutator bars of the switch S2. To this end, all of the odd-numbered commutator bars 33 of the switch S1 are electrically connected by conductors 42 to the correspondingly numbered commutator bars 28 of the master switch M. Inasmuch as the diametrically opposed commutator bars of the two switches are electrically interconnected, it is only necessary to employ six conductors 42 in the present instance for respectively interconnecting the odd-numbered bars, say, from 1 to 11 of the switches S1 and M. The odd-numbered bars from 13 to 23 of each switch are electrically connected with the diametrically opposed odd-numbered bars from 1 to 11, respectively, by means of the connections just described. The even-numbered commutator bars 33' of the switch S2 are electrically connected by conductors 42' with the corresponding even-numbered commutator bars 28 of the master switch M, and because of the diametrical interconnections between the commutator bars of the switches S2 and M, only six of the conductors 42' need be utilized.

The control unit C is governed by the commutator switches M, S1 and S2 for the purpose of controlling the operation of either of two relays R1 and R2. Such relays are adapted to be rendered operative by the control unit C in response to the establishment of an abnormal condition such as a condition tending toward wheel sliding in the case of railway equipment and the like, in a manner to be explained hereinafter, to operate certain devices for the purpose of correcting the undesirable condition. Such other devices may comprise, for example, means for sanding the rails ahead of the wheels in the direction of travel of a railway vehicle or may be means for reducing the effectiveness of the braking means. In an instance where sand is to be supplied, the relay R1 can be employed to operate the means for sanding the rails when the vehicle is travelling in its forward direction, while the relay R2 will be utilized to control the sanding apparatus when the vehicle is travelling in its reverse direction.

Where the control apparatus is to be utilized on a railway vehicle or the like, the conventional drum controller D, by means of which the operator controls the operation of the equipment, is employed, in the present instance, to condition either the relay R1 or the relay R2 for operation in dependence upon the direction of movement of the vehicle. Thus, if the controller D is in its "forward" position, a contact strip 43 thereof bridges a pair of spaced contacts 44 and 45, and thereupon a circuit path is established from a source of electrical current, such as a line wire L1, through a conductor 46, contacts 45, 43 and 44, and a conductor 47 to the winding of the relay R1, thereby conditioning this relay for operation under the control of the unit C. When the drum controller D is in its "reverse" position, a contact strip 48 thereof bridges the spaced contacts 45 and 49, thereby establishing a circuit path from the line wire L1 through the conductor 46, contacts 45, 48 and 49 and a conductor 50 to the winding of the relay R2, thereby conditioning this relay for operation under control of the unit C.

The control unit C includes a means for detecting the existence of an abnormal condition in the course of operation of railway equipment or the like, and in the present embodiment of the invention such means comprises a set of slow-to-release relays SR1, SR2 and SR3 which are allocated to the secondary switch S1, and another set of slow-to-release relays SR1', SR2' and SR3' operatively associated with the secondary switch S2. The windings of all of these relays are electrically connected on one side to a conductor 76 leading to a terminal 51 which is connected by a conductor 52 to the line wire L2. The other sides of the windings of the slow-to-release relays SR1 and SR2 are connected by conductors 53 and 54, respectively, to terminals 55 and 56 from which conductors 57 and 58 lead to terminals 59 and 60 of the switch S1. Jumpers 61 and 62 connect the terminals 59 and 60, respectively, to the conducting rings 38 and 39 of the switch S1. The windings of the slow-to-release relays SR1' and SR2' are electrically connected to terminals 55' and 56', respectively, which are connected by conductors 57' and 58' to terminals 59' and 60' of the switch S2, from whence jumpers 61' and 62' connect these terminals to the conducting rings 38' and 39', respectively.

To maintain the brush 29 of the master switch M electrically connected directly to the line wire L1, the ring 31 is connected by a jumper 69 to the terminal 68 of the switch M, from whence a conductor 67 leads to a terminal 66 of the control unit C. A jumper 65 connects the terminal 66 to the terminal 64 which is electrically connected by the conductor 63 to the line wire L1. Hence, if the brush 29 of the switch M should at any time engage a commutator bar 28 that is electrically connected to a commutator bar 33 of the switch S1 which is at such an instant engaged by either of the brushes 34 or 35, a circuit is completed through the winding of the slow-to-release relay SR1 or SR2, as the case may be, to thereby cause this relay to become energized.

Thus, assuming the parts to be in the positions shown in the drawing, circuit is extended from the line wire L1 through the brush 29 of the switch M, the commutator bar 28 numbered 7, a conductor 42, the commutator bar 33 numbered 7 of the switch S1, brush 34, ring 38, conductors 61, 57 and 53, winding of relay SR1 and thence through the conductor 52 back to the line wire L2. Relay SR1 thereupon energizes and closes its contact 70. Similarly, if brush 35 had been engaged with the No. 7 commutator bar 33 of the switch S1, a circuit would have been completed through the winding of the relay SR2, thereby causing this relay to energize and close its contact 71.

Under ideal conditions, where the wheels on the shafts 25 and 26 are of the same diameter and there is no condition tending toward wheel sliding, the shafts 25 and 26 rotate in synchronism and therefore the relays SR1 and SR2 will either both remain deenergized, or only one of these relays will become energized while the other remains deenergized. If, however, there is a difference in rotative speeds of the shafts 25 and 26 due to a difference in wheel diameters or the existence of a condition tending toward wheel sliding, the master brush 29 is successively brought into electrical contact with the brushes 34 and 35 of the switch S1. This results in the alternate energization of the slow-to-release relays SR1 and SR2, and when either of these relays has been so energized, it remains in an operative condition for at least a predetermined length of time once the energizing circuit has been discontinued, during which interval it maintains its contact 70 or 71 closed.

Because of the manner in which the diametrically opposed commutator bars of each of the various commutator switches are electrically connected together, the master brush 29 is brought into electrical contact with each brush as 34 or 35 of each secondary switch as S1 twice as frequently as would be the case if the commutator bars of each switch were electrically independent of each other. For this reason the arrangement shown in the drawing is advantageously adapted for use where the shafts as 25 and 26 are relatively slow-moving, as are the axles of locomotive driving wheels, for example. Because of the ninety-degree spacing of the brushes as 34 and 35 of each secondary switch as S1, a maximum time interval elapses from the instant the master brush 29 moves out of electrical contact with a brush as 34 and into electrical contact with a brush as 35 in the course of relative rotation of the shafts as 25 and 26.

The release time of the relays SR1 and SR2 is so adjusted that a limited rate of relative rotation of the shafts 25 and 26 may take place without causing these relays to be in a concurrently operative condition at any time, which is to say, that each of the relays SR1 and SR2 has sufficient time to release and open its contact intermediate the establishment of successive electrical contacts between the master brush 29 and the brushes 34 and 35. Such limited amount of relative rotation may be caused, for example, by a difference in diameters of the wheels on the shafts or axles 25 and 26 and not because of any tendency toward wheel sliding. However, when there is a tendency for one of the wheels to slide during a braking operation, the axle on which it is mounted, say, the axle 26, slows down perceptibly relative to the other axle 25; while if such a tendency to slide occurs in a driver wheel of a locomotive during the application of driving power thereto, the corresponding axle, as 26, will increase its speed perceptibly relative to the other axle 25. Under these conditions the time interval which elapses between the alternate energizations of the slow-to-release relays SR1 and SR2 becomes so short that these relays may assume a concurrently operative condition, that is, one of the relays becomes energized prior to the time the other relay has released; hence the contacts 70 and 71 of these relays are maintained concurrently closed at least for an instant.

The winding of the slow-to-release relay SR3 is embodied in a series circuit which includes the contacts 70 and 71 of the relays SR1 and SR2, this series circuit extending between the terminals 51 and 64 of the control unit C which are respectively connected electrically to the line wires L2 and L1. Simultaneous closure of the relay contacts 70 and 71 therefore completes this series circuit through the winding of the relay SR3 to thereby energize this relay. As relay SR3 energizes it closes its contact 72 and maintains this contact closed at least for a predetermined time, which is the release time of the relay SR3. If the discrepancy in rotative speeds of the shafts 25 and 26 is sufficiently great to maintain the slow-to-release relays SR1 and SR2 in a concurrently operative condition at least for an instant during each turn of the master brush 29 relative to the brushes 34 and 35, the slow-to-release relay SR3 remains operative for a longer period than the aforesaid predetermined time, until the aforesaid series circuit through its winding has been broken for a period greater than the release time of the relay SR3.

Closure of the contact 72 of relay SR3 completes a circuit from the line wire L1 through the winding of the selected one of the relays R1 and R2 (depending upon the setting of the drum controller D) and through a conductor 73 leading to a terminal 74 of the control unit C, thence through the conductor 75 and the relay contact 72 to the conductor 76 which leads from the windings of all of the relays in the control unit C to the terminal 51, and thence through the conductor 52 to the line wire L2. Thus, the selected relay R1 or R2 is energized for effecting the necessary control operation, such as sanding the rails, to thereby tend to substantially equalize the rotative speeds of the shafts 25 and 26. When such a condition of substantial equality of rotative speeds has been attained, the frequency with which the slow-to-release relays SR1 and SR2 are alternately energized decreases until one or the other of these relays maintains its contact open at all times while the contact of the other such relay is closed. When this condition prevails, relay SR3 commences to deenergize and after a predetermined time releases its contact 72 to interrupt the circuit through the winding of the previously energized relay R1 or R2.

For the purpose of comparing the speeds of the shafts 25 and 27, as has been previously explained, the control unit C includes the slow-to-release relays SR1', SR2' and SR3' which are operatively related to the switch S2 in the same manner as are the slow-to-release relays SR1, SR2 and SR3, respectively, in the case of the switch S1. Hence, if the master brush 29 of the switch M is brought into electrical contact with the brush 34' of the switch S2, a circuit is completed through the winding of the slow-to-release relay SR1' for energizing this relay, and if the master brush 29 comes into electrical contact with the brush 35' of the switch S2, a circuit is completed to the winding of the slow-to-release relay SR2' for energizing this relay. In the event an abnormal condition should arise whereby the rotative speeds of the shafts 25 and 27 differ in at least a predetermined amount, the relays SR1' and SR2' assume a concurrently operative condition, at least for an instant, to thereby energize the relay SR3' which closes its contact 72' and thereby completes a circuit from the line wire L1 through the winding of the selected relay R1 or R2 to the line wire L2. Hence it will be seen that the switch S2 operates in conjunction with the switch M to govern the relays SR1', SR2' and SR3' for detecting an abnormal condition such as a condition tending toward wheel sliding with respect to the wheels mounted on the axles 25 and 27, and upon occurrence of such a condition the control unit C functions to operate the selected relay R1 or R2 for correcting the undesirable condition, as for example, by sanding the rails ahead of the wheels.

It will be seen from the foregoing that the control operation, such as sanding the rails, is automatically initiated by the control unit C whenever the difference in rotative speeds of the rotative elements such as the shafts 25 and 26, or 27, whose speeds are being compared, exceeds a predetermined limit, and that the control operation is interrupted when the difference in rotative speeds has been diminished to less than said predetermined limit. It will be understood that while in the foregoing description of operation it was assumed that the shaft 25 was the master rotatable element and that the rotative speeds of the shafts 26 and 27 were to be compared therewith, any of the independently rotatable elements may be selected as the "master" element, with which the switch M is to be associated. Moreover, it may happen that the so-called master element is the one which is operating abnormally, as for instance where the wheels on the axle 25 commence to unduly slow down relative to the wheels on, say, the axle 26 preparatory to sliding during a braking operation. In this event, as well as in the case where the reverse is true, the control unit C functions to correct the condition. Moreover, while it has been assumed that the control operation to be effected is one which preferably involves a selection of control devices as the relays R1 and R2 in accordance with the direction of travel of the vehicle, it would be equally feasible to employ a single device which operated independently of the direction of travel of the vehicle to effect a control operation, such as releasing or otherwise reducing the effectiveness of the brakes of the vehicle during a braking operation, whenever a tendency toward wheel sliding developed.

In the event it is desired to effect a control operation independently of the control unit C, a foot-operated switch 71 may be provided as shown for closing circuit from the line wire L2 to the conductor 73 at the will of the operator. When the switch 71 is closed, it supplants the control unit C and thus enables either the relay R1 or R2, depending upon the setting of the drum controller D, to be independently operated if and when desired.

While the arrangement of relays in the control unit C and the manner of their connection with the parts external thereto has been found to be highly satisfactory and dependable in service, there may be instances in which it is desired to employ modifications of this arrangement, as for example where it is needed to determine not only the existence of a substantial difference in rotative speeds of the elements as 25 and 26, or 27, but also which of these elements is rotating at an abnormal rate, and to effect a control operation only in respect of such an element; or it may be desired to determine the sense of relative rotation of an element as 26, or 27, with respect to the master element 25, that is, whether the discrepancy is due to an increase or decrease in speed of one relative to the other, and to correct the speed of only the element as 26 or 27 accordingly. Such additional modifications or improvements on the basic relay circuits are fully disclosed in my United States patents, Nos. 2,232,750, 2,232,752 and 2,232,753.

It has been mentioned hereinabove that the sensitivity of the control apparatus is somewhat affected by the widths of the brushes of the various commutator switches. Thus, if the width of the master brush 29 of the switch M is increased in width, it will take a shorter time for this brush to move out of electrical contact with, say, the brush 34 of the switch S1 and into electrical contact with the brush 35 of this switch, assuming other conditions to be the same. Hence, the interval between the successive energizations of the slow-to-release relays decrease for the same relative speed, which means that they will be rendered concurrently operative at a lower relative speed than before, thereby increasing the sensitivity of the apparatus. The same effect would be experienced if the brushes 34 and 35 were increased in width, or were moved closer together, so that in either event the control unit C would be operated to effect a control operation at a relatively low difference in rotative speeds of the elements whose speeds are being compared. On the other hand, if the brush widths are decreased, the sensitivity is lessened because then a longer time is required for the master brush to successively contact the brushes 34 and 35 electrically. Another way to vary the sensitivity of the apparatus, without changing the characteristics of the relays in the control unit C, which obviously may be done, would be to vary the width and number of the commutator bars in any of the switches in the manner described above in reference to the brushes.

Among the advantages of the present invention it may be noted that because of the manner of electrically interconnecting the diametrically opposed commutator bars of the various commutator switches, the number of conductors as 42 and 42' interconnecting each secondary switch as S1 and S2 with the master switch M has been reduced to one-half the number which would be required if all the commutator bars of the master switch M were to be separately connected by conductors as 42 or 42' to corresponding commutator bars of the secondary switches, and if the conductors 42 and 42' are to be embodied in cables, this greatly decreases the bulk of the cables.

Another important advantage is that while only one master commutator switch M is employed, each of the secondary switches as S1 and S2 is electrically isolated from every other secondary switch so that there is no possibility of misoperation due to undesirable bridging conditions which might otherwise exist when the brushes assume certain relative positions. This has been achieved in the present instance by electrically connecting the commutator bars of the switch S1 with only the odd-numbered commutator bars of the master switch M, whereas the commutator bars of the switch S2 are electrically connected only to even-numbered commutator bars of the switch M. It will thus be seen that, in effect, the commutator bars of the master switch are grouped in sets, there being as many commutator bars in each set as there are secondary switches and the sets of commutator bars and the commutator bars in the sets are so arranged relative to each other that the brush successively moves from engagement with a commutator bar connected to one secondary switch into engagement with the commutator bar connected to the other secondary switch and then into engagement with the commutator bar connected to the first just mentioned secondary switch. Thus if there were three secondary switches instead of two in the present instance, there would be three commutator bars in each of the sets of bars included in the master switch, and these sets and the commutator bars therein would be arranged for engagement by the brush of the master switch in the manner just explained and the commutator bars in each set would be respectively connected one to each of the secondary switches and this, of course, would apply if there were more than three secondary switches in which circumstances there would be as many bars in each set as there are secondary switches.

Because of the manner in which the secondary switches are electrically isolated from each other, it is not possible for circuit to be extended, for example, through the master brush 29 to a brush as 34 or 35 of the switch S1 and thence to a brush 34' or 35' of the switch S2 for prematurely energizing or unduly prolonging the energization of one of the slow-to-release relays SR1' or SR2'. Similarly, the slow-to-release relays SR1 and SR2 become energized only when there is electrical contact between the master brush 29 and the brushes 34 and 35 regardless of the positions of the brushes 34' and 35' of the switch S2.

Hence while I have illustrated and described only a preferred embodiment of my invention it is to be understood that this is capable of variation and modification and I, therefore, do not wish to be limited to the precise details set forth but desire to avail myself of such changes and alterations as fall within the scope of the following claims.

I claim:

1. In an apparatus for detecting the need of a control operation with respect to at least three independently rotatable elements, a master commutator switch operatively associated with one of said elements and including a series of commutator bars arranged consecutively about a circle and cooperating with brush means driven rotatively by said one element, secondary commutator switches one operatively associated with each of the other of said rotatable elements and each including a series of commutator bars arranged consecutively about a circle and cooperating with brush means driven rotatively by its respective element, means electrically connecting certain of the commutator bars of said master switch respectively with corresponding commutator bars of each of said secondary switches, the commutator bars of said master switch which are electrically connected to the commutator of each secondary switch being different than those commutator bars of said master switch that are electrically connected to the commutators of the other secondary switches, and electrically-operated means in circuit with the brush means of said commutator switches and responding variantly under various conditions dependent upon whether or not said elements are rotating in timed relation with each other.

2. In an apparatus for detecting the need of a control operation with respect to at least three independently rotatable elements, a master commutator switch including a series of commutator bars arranged consecutively about a circle and operatively associated with one of said elements, a plurality of secondary commutator switches operatively associated with other ones of said rotatable elements and each including a series of commutator bars arranged consecutively about a circle, means electrically connecting certain of the commutator bars of said master switch respectively with corresponding commutator bars of each of said secondary switches, the commutator bars of said master switch which are electrically connected to the commutator of each secondary switch being different than those commutator bars of said master switch that are electrically connected to the commutators of the other secondary switches, a pair of brushes for each secondary switch, the pair of brushes for each such switch being angularly spaced and being driven by the element to which its switch pertains so as to cooperate with its respective commutator bars, a single brush cooperating with the commutator bars of said master switch and driven rotatively by the element to which said master switch pertains, and electrically-operated means in circuit with the brush means of said commutator switches and responding variantly under various conditions dependent upon whether or not said elements are rotating in timed relation with each other.

3. In an apparatus for detecting the need of a control operation with respect to at least three independently rotatable elements, a master commutator switch including a series of commutator bars arranged consecutively about a circle and operatively associated with one of said elements, a plurality of secondary commutator switches operatively associated with other ones of said rotatable elements and each including a series of commutator bars arranged consecutively about a circle, means electrically connecting certain of the commutator bars of said master switch respectively with corresponding commutator bars of each of said secondary switches, the commutator bars of said master switch which are electrically connected to the commutator of each secondary switch being different than those commutator bars of said master switch that are electrically connected to the commutators of the other secondary switches, a pair of brushes for each secondary switch, the pair of brushes for each such switch being angularly spaced and being driven by the element to which its switch pertains so as to cooperate with its respective commutator bars, a single brush cooperating with the commutator bars of said master switch and driven rotatively by the element to which said master switch pertains, a plurality of sets of control relays, each such set pertaining to one of said secondary switches, a final control relay connected for energization under control of any one of said sets of control relays, means electrically connecting each of said sets of relays to the brushes of the secondary switch to which the set pertains, and means including the single brush of said master switch for completing the energizing circuits of all of said sets of relays.

4. In an apparatus for detecting the need of a control operation with respect to at least three independently rotatable elements, a master switch operatively associated with one of said elements, secondary switches respectively associated with the other of said elements, each of said switches including a plurality of commutator bars arranged consecutively about the circumference of a circle, the commutator bars of said master switch being arranged in sets in each of which there are as many commutator bars as there are secondary switches, means respectively electrically connecting corresponding commutator bars in said sets with commutator bars in a particular secondary switch to thereby connect the commutator bars of the secondary switches with the commutator bars of the master switch in a predetermined manner, brush means for each of said switches and operatively associated with the commutator bars of the associated switch and driven rotatively by the associated rotatable element, and electrically operated means in circuit with the brush means of said switches and responding variantly under various conditions dependent upon whether or not said elements are rotating in timed relation with each other.

5. In an apparatus for detecting variation from a desired speed relation among at least three relatively rotatable elements in excess of a predetermined rate of variation, said apparatus comprising a single brush commutator and a plurality of multiple brush commutators, a plurality of sets of control relays, each set pertaining to one of said multiple brush commutators and including a plurality of relays each having one terminal connected to one side of a source of current and their other terminals independently connected electrically with different brushes of the multiple brush commutator to which the set pertains, means electrically connecting the single brush of said single brush commutator to the other side of said source, each of said commutators including a series of commutator bars arranged consecutively about a circle and the brushes of each commutator being driven by one of said elements, and means electrically connecting certain of the bars of said single brush commutator respectively with corresponding commutator bars of each of said multiple brush commutators, the commutator bars of said single brush commutator which are electrically connected to the commutator of each multiple brush commutator being different than those commutator bars of said single brush commutator switch that are electrically connected to other commutator bars.

6. In an apparatus for detecting the need of a control operation with respect to at least three independently rotatable elements, a plurality of commutator switches one operatively associated with each of said elements and each comprising a series of commutator bars arranged consecutively about a circle and cooperating with brush means driven rotatively by the element with which the commutator switch is associated, circuit means electrically interconnecting selected of said commutator bars of one of said switches respectively with corresponding commutator bars of a second one of said switches, circuit means electrically interconnecting different selected ones of said commutator bars respectively with corresponding commutator bars of a third one of said switches electrically independently of said first mentioned circuit means, and electrically operated means connected with said circuit means and controlled by said brush means, said electrically operated means responding variantly under various conditions dependent upon whether or not said elements are rotating in timed relation with each other.

ROSSER L. WILSON.